Figure 1:
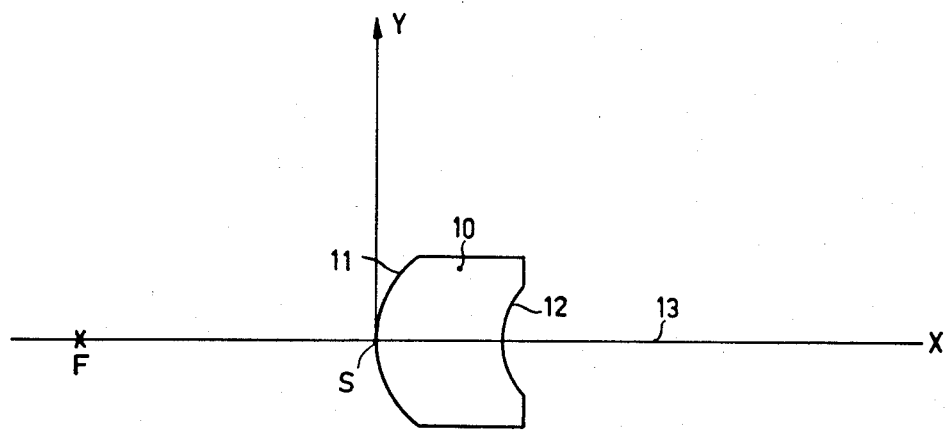

350-432

OR 4,027,952

United States

Hugues

4,027,952

June 7, 1977

[54] SINGLE OPTICAL LENS WITH LARGE APERTURE AND LARGE FIELD

[75] Inventor: Edgard Alfred Hugues, Courbevoie, France

[73] Assignee: U.S. Philips Corporation, New York, N.Y.

[22] Filed: May 7, 1975

[21] Appl. No.: 575,148

[30] Foreign Application Priority Data

May 14, 1974 France .................... 74.16628

[52] U.S. Cl. ................ 350/189; 350/175 NG
[51] Int. Cl.² ............................. G02B 3/04
[58] Field of Search ............ 350/189, 175 NG

[56] References Cited

UNITED STATES PATENTS

| 2,388,118 | 10/1945 | Burch | 350/189 X |
| 2,719,235 | 9/1955 | Emerson | 350/189 X |
| 3,486,825 | 12/1969 | Howland | 350/189 X |
| 3,877,792 | 4/1975 | Cox et al. | 350/175 NG X |

Primary Examiner—Paul A. Sacher
Attorney, Agent, or Firm—Frank R. Trifari; Simon L. Cohen

[57] ABSTRACT

The invention relates to single lenses with large aperture and large field.

The paraxial parameters of a lens with spherical refractive surfaces are selected in advance. The lens aberrations are corrected in such a way by aspherization of the refractive surfaces, that the wave front aberration which is expanded in a series as a function of the aperture, at least contains sixth-degree terms.

The invention may be employed in heads for reading audio or video information on rotary record carriers.

6 Claims, 4 Drawing Figures

SINGLE OPTICAL LENS WITH LARGE APERTURE AND LARGE FIELD

The invention relates to an optical element, which takes the form of a lens, which comprises only one component, to be called single lens hereinafter, which is anastigmatic in a range of very large aperture for field which are comparatively large with respect to those which are employed in for example microscopy and which is only suited for monochromatic light. The invention also relates to the manufacture of such an element.

In this respect "very large aperture" is to be understood to mean an aperture which corresponds to the limitation of the beams by the geometry of the refractive lens surfaces and for which the angle of incidence of the marginal rays at the refractive surface at the object side of the lens can attain a value of 90°.

It is an object of the present invention to provide the technical specifications for correcting the aberrations of such a lens in such a way that the anastigmatic properties are realized at such a large aperture.

It is known that a lens which is constituted by a single element which is bounded by two spherical surfaces can be free from spherical aberration, coma and astigmatism for large apertures and monochromatic light, if the radii of curvature of the surfaces are suitably selected and if said element is employed so that the intermediate image of the object formed by one of the refractive surfaces is disposed in the well-known Weierstrass position. This is for example the case with the front lens of a mircoscope objective which is oil-immersed, the object then being in direct contact with said front lens. Such an arrangement has several drawbacks: first of all the magnification is determined once for all by the choice of the glass and equals the square of the refractive index $n$ of the glass; secondly, the device has a free object distance (distance between the object and the first refractive face) which is very small or substantially zero; finally, the image is virtual, i.e. useless without additional image transfer.

Furthermore, it is known to correct lenses with several elements for spherical aberration and coma by making one or more of the refractive faces which constitute said lenses aspherical. This yields aplanatic lenses whose anastigmatism is independent of the location of the diaphragm. Said freedom from astigmatism can then be obtained for large apertures.

It is far more difficult to solve the problem completely when the number of faces to be made aspherical is limited, as is the case with the single lens, and it becomes even more difficult as the desired aperture increases.

U.S. Pat. No. 2,388,118 claims a single lens whose aberrations have been corrected by making at least one of its bounding surfaces aspherical, the surfaces which has been made aspherical exhibiting deviations from the spherical shape, which in any point of the refractive surface are expressed in cartesian co-ordinates by at the most fourth-degree terms as a function of the distance from said point to the axis of revolution of the lens, which deviation may be utilized to correct spherical aberration, coma and astigmatism up to the third order.

Such corrections do not eliminate higher order aberration terms, which may not be neglected in the case of large apertures as with the present invention.

The investigations which have led to the invention, have revealed that in order to obtain the previously discussed maximum aperture, it is necessary to include terms up to the twentieth order in the expansion of the Taylor series of the cartesian equation for the refractive surfaces, as a function of the distance to the axis.

This is not very encouraging when it is furthermore borne in mind that the calculations should allow for a large number of design parameters, namely the refractive index, the osculation curvature of the refractive surfaces on the axis of the lens, its thickness, the magnification and the focal length of said lens, for which the relations between said parameters in the case of complete correction of the aberration allowance being made for the desired large aperture, are not known a priori.

Through numerous investigations and tests the inventor has greatly contributed to the simplification of the technical problem to be solved, in such a way that in future those skilled in art will have a method at their disposal for the technical design of a single lens with a large aperture and a comparatively large field for a wide range of applications, which method is found to be simple and systematical.

Figure 2:
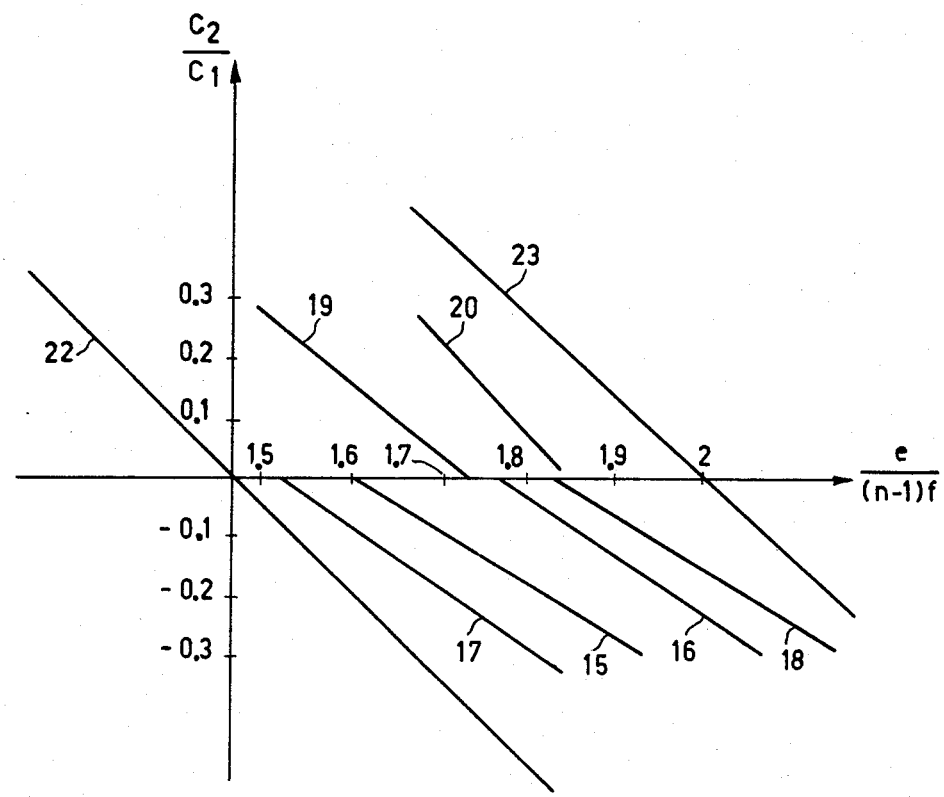
Figure 3:
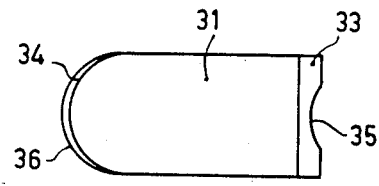
Figure 4:
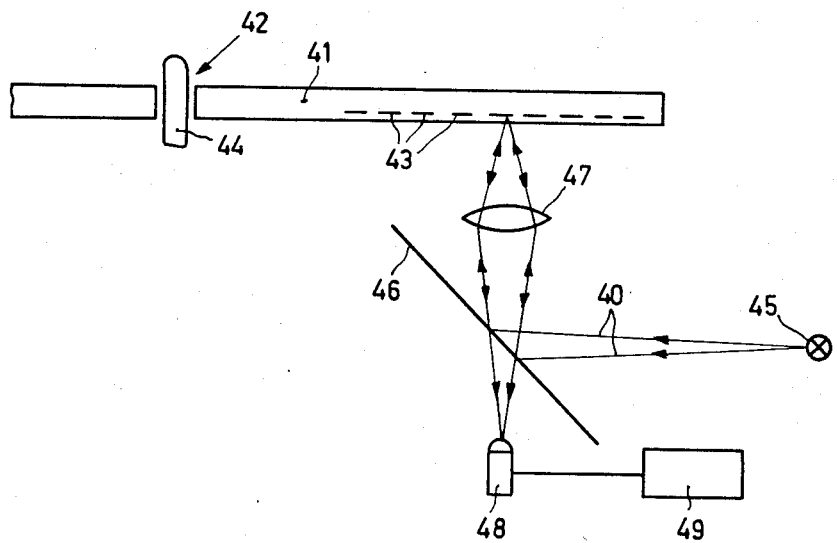

Said method will be described by way of example with reference to the drawing in which:

FIG. 1 schematically represents a single lens,

FIG. 2 shows graphs in cartesian co-ordinates which represent a "region", which serves to define the method according to the invention, FIG. 3 shows a special embodiment of the invention, and FIG. 4 shows a special application of a single lens according to the invention.

In FIG. 1 the object space is situated to the left of the lens 10 and the image space to the right.

The osculation curvatures of the refractive faces 11 and 12 of the lens on its axis of revolution 13 are $C_1$ and $C_2$ respectively. The refractive index of the glass of the lens, its thickness and its focal length are designated $n$, $e$ and $f$ respectively.

It has been found that there are two curves, which give the ratio $C_2/C_1$ as a function of the ratio $e/(f(n-1))$ at a given magnification, a refractive index $n$ and a focal length $f$, each of the curves corresponding to a condition of correction in which the astigmatism and the curvature of field respectively equal zero.

Thus, a region can be determined which is disposed between the two curves whose points have the co-ordinates $$\left( \frac{e}{f(n-1)}, \frac{C_2}{C_1} \right)$$

for which an image formation is obtained which in respect of the aberrations is only diffraction-limited for image field dimensions which are common in microscopy. FIG. 2 shows two of said curves, designated 19 and 20, for zero astismatism and zero curvature field respectively, and they correspond to a magnification $\gamma = -1/20$, while the refractive index is 1.5 and the focal length 7.52 mm. This region can be moved in the plane $$\left( \frac{e}{f(n-1)}, \frac{C_2}{C_1} \right),$$

when the magnification, the refractive index and the focal length are changed, which at first sight does not contribute to a systematization of the calculations.

When for example the refractive index and the focal length remain 1.5 and 7.52 respectively, the regions which correspond to the values $\gamma = \frac{1}{4}$ and $\gamma = \frac{1}{2}$ are those which are bounded by the curve pairs (15, 18) and (17, 16), the curves 15 and 17 corresponding to zero astigmatism and the curves 16 and 18 to zero curvature of field.

A simplification is obtained empirically owing to the fact that when the refractive index, the focal length and the magnification are varied the collection of regions is enclosed by two lines which are represented by the following equations:

$$\frac{C_2}{C_1} = 2.58 - 1.29 \frac{e}{(n-1)f}$$

$$\frac{C_2}{C_1} = 2.2 - 1.5 \frac{e}{(n-1)f}$$

and which in FIG. 2 are represented by the lines 22 and 23 respectively in the co-ordinate plane $$\left( \frac{e}{(n-1)f}, \frac{C_2}{C_1} \right).$$

Thus, a new wider range of permissible values appears to be defined. Said range is situated between the straight lines 22 and 23 for the points for which the requirements of zero astigmatism and zero curvature-of-field are very closely approximated.

Each point of said region corresponds to a single lens which is defined by its paraxial constants, which are given by the co-ordinates of said point (radius of curvature of refractive surfaces, thickness, refractive index, focal length) and whose coefficients of aspherisation of the refractive surfaces can be determined up to the twentieth degree as a function of the distance from the points of said refractive surfaces to the axis, if necessary, by conventional methods of minimization of wave-front aberrations (for this see for example the article by D. Feder: "Automatic Optical Design" in Applied Optics, Vol. 2, No. 12, December 1963, pages 1211 and further).

Thus, according to the invention, a method has been elaborated for designing a single lens, allowance being made for the wave front aberration in the expression, which is represented by a series expansion as a function of the aperture with conventional quality criteria, for example, diffraction-limited quality. The invention is characterized in that the single lens has spherical refractive surfaces, whose parameters are given by the o-ordinates of a point of the region which is bounded in the plane with the co-ordinate axes $$\left( \frac{e}{(n-1)f}, \frac{C_2}{C_1} \right)$$

by two straight lines with the respective equations:

$$\frac{C_2}{C_1} = 2.58 - 1.29 \frac{e}{(n-1)f}$$

$$\frac{C_2}{C_1} = 2.2 - 1.5 \frac{e}{(n-1)f}$$

and which is situated between these two straight lines, and that each of the refractive surfaces is made aspherical by known methods for minimizing wave-front aberration, the aspherization of the refractive surfaces being expanded in a series which contains terms of at least the sixth degree as a function of the distance between the points of the refractive surface and the axis of revolution of the lens.

Hereinafter two single lenses will be described which are manufactured in accordance with said method.

To make each of the refractive surfaces aspherical a series expansion has been determined for the straight section through the axis of each of the refractive surfaces $X = f(Y)$, the system of orthogonal axis for the two refractive surfaces being shown in FIG. 1, in which the origin of the co-ordinates is situated on the refractive surface $C_1$ at the top S. Said expansion takes the form:

$$X = \frac{Cy^2}{1 - \sqrt{1 - (1+k)C^2Y^2}} + \sum_i \epsilon_i Y^{2i}$$

in which C represents the osculation curvature of the refractive surface near its top, $k$ is a specific coefficient of a conic section with the special values $k = 0$ for a circle and $k = -1$ for a parabola, whilst the coefficients $\epsilon_i$ are coefficients of aspherization. The values of said coefficients are given in the table for each of the two examples which are described.

1ST EXAMPLE

The refractive index of glass is 1.7, the desired focal length is 7.55 mm at a magnification of the order of $-1/20$. The region of FIG. 2 shows a possible combination of spherical refractive surfaces for the formation of a single lens, for which:

$$e = 8.18 \text{ min}, C_2/C_1 = 0.284$$

After calculation a single lens element is obtained whose characteristics are specified in Table I, which characteristics allow for the fact that the lens is used in conjunction with a covering glass having a thickness of 1.5 mm and a refractive index of 1.5.

Such a lens has the following imaging parameters:
object field: 10.0 mm at either side of the axis;
image field: 0.50 mm at either side of the axis;
numerical aperture at diffraction-limited quality: 0.6.

Moreover, the tangential wave-front aberration $W_t$ and the sagittal wave-front aberration $W_S$ for a situation in which the entrance pupil is disposed in the object focal plane, are specified in $\mu$m in the following table as a function of the height $h$ in mm, measured in said pupil, the wave length $\lambda$ under consideration being 0.5 $\mu$m.

| h (mm) | −2.1 | −1.4 | −0.7 | 0.7 | 1.4 | 2.1 |
|---|---|---|---|---|---|---|
| $W_t(\mu m)$ | 0.44 | 0.12 | 0.01 | 0 | −0.03 | −0.06 |
| $W_S(\mu m)$ | 0.18 | 0.08 | 0.02 | 0.02 | 0.08 | 0.18 |

TABLE I $n = 1.7$  $C_2/C_1 = 0.284$  free image distance: 2.6688 mm
$C_1 = 0.2068086$ mm$^{-1}$  free object distance: $-160$ mm
$C_2 = 0.0586528$ mm$^{-1}$  $\gamma = -0.0565$
$e = 8.184$ mm
$f = 7.5573$ mm distance from top of refractive surface at object side to object focus (distance SF in Fig. 1) $\Bigg\} = 9.0510$ mm.

Coefficients k and e

| Refractive surface 11 | | Refractive surface 12 | |
|---|---|---|---|
| k | $-0.258$ | k | $-1$ |
| $e_2$ | $-0.7179284 \cdot 10^{-4}$ | $e_2$ | $0.8844274 \cdot 10^{-2}$ |
| $e_3$ | $-0.2367655 \cdot 10^{-5}$ | $e_3$ | $0.5837108 \cdot 10^{-4}$ |
| $e_4$ | $0.9787664 \cdot 10^{-6}$ | $e_4$ | $0.1042128 \cdot 10^{-2}$ |
| $e_5$ | $-0.262211 \cdot 10^{-6}$ | $e_5$ | $-0.1625183 \cdot 10^{-2}$ |
| $e_6$ | $0.3795457 \cdot 10^{-7}$ | $e_6$ | $-0.1586676 \cdot 10^{-2}$ |
| $e_7$ | $-0.3174790 \cdot 10^{-8}$ | $e_7$ | $-0.8957358 \cdot 10^{-3}$ |
| $e_8$ | $0.1535543 \cdot 10^{-9}$ | $e_8$ | $0.2977601 \cdot 10^{-3}$ |
| $e_9$ | $-0.3983771 \cdot 10^{-11}$ | $e_9$ | $-0.5380995 \cdot 10^{-4}$ |
| $e_{10}$ | $0.4301476 \cdot 10^{-13}$ | $e_{10}$ | $0.4125182 \cdot 10^{-5}$ |

2ND EXAMPLE

The refractive index of the glass is 1.5 at a focal length of the order of 7.52 mm and a magnification of the order of $-1/20$.

A possible combination of spherical refractive surfaces according to FIG. 2, corresponds to:

$$e = 5.83 \text{ mm and } C_2/C_1 = 0.202$$

After calculation of the coefficients of aspherization a single lens is obtained, whose characteristics are specified in Table II and whose imaging parameters are as follows:

Object field: 5 mm at either side of the axis;
Image field : 0.25 mm;
numerical aperture at diffraction-limited quality: 0.45.

The wave-front aberrations Wt and Ws as a function of the height h of a pupil which is disposed in the object focal plane, are specified in the following Table:

| h (mm) | $-3$ | $-2$ | $-1$ | 1 | 2 | 3 |
|---|---|---|---|---|---|---|
| $W_t(\mu m)$ | 0.18 | 0.10 | 0.02 | 0.01 | 0.06 | 0.20 |
| $W_s(\mu m)$ | | | | 0.02 | 0.07 | 0.12 |

TABLE II $n = 1.5$  $C_2/C_1 = 0.202$  free object distance: $-160$ mm
$C_1 = 0.2912733$ mm$^{-1}$  free image distance: 3.63171 mm
$C_2 = 0.0582546$ mm$^{-1}$
$e = 5.835$
$f = 7.51829$
$\gamma = 0.0495825$ Coefficients k and $e_i$

| Refractive surface 11 | | Refractive surface 12 | |
|---|---|---|---|
| k | $-0.291$ | k | $-1$ |
| $e_2$ | $-0.1926581 \cdot 10^{-2}$ | $e_2$ | $0.1079271 \cdot 10^{-1}$ |
| $e_3$ | $-0.1537706 \cdot 10^{-4}$ | $e_3$ | $0.1515678 \cdot 10^{-2}$ |
| $e_4$ | $0.8695365 \cdot 10^{-5}$ | $e_4$ | $-0.1388911 \cdot 10^{-2}$ |
| $e_5$ | $-0.2938304 \cdot 10^{-5}$ | $e_5$ | $-0.2261891 \cdot 10^{-2}$ |
| $e_6$ | $0.6086732 \cdot 10^{-6}$ | $e_6$ | $-0.1953849 \cdot 10^{-2}$ |
| $e_7$ | $-0.7359854 \cdot 10^{-7}$ | $e_7$ | $0.1053471 \cdot 10^{-2}$ |
| $e_8$ | $0.6318046 \cdot 10^{-8}$ | $e_8$ | $-0.3237450 \cdot 10^{-3}$ |
| $e_9$ | $-0.2886018 \cdot 10^{-9}$ | $e_9$ | $0.5091558 \cdot 10^{-4}$ |
| $e_{10}$ | $0.5788596 \cdot 10^{-11}$ | $e_{10}$ | $-0.2840845 \cdot 10^{-5}$ |

It has been assumed hereinbefore that the single lens was disposed in air. It is obvious that said lens may be disposed in any other medium of refractive index $n'$. The aforegoing remains valid when the refractive index $n$ is substituted by the relative refractive index $n/n'$. Furthermore, it is obvious that the invention also covers the case in which one of the refractive surfaces of the lens separates the lens glass from a medium other than air.

The lenses according to the present invention may consist of glass or of a transparent plastics material In the last-mentioned case the invention also relates to the device which consists of a transparent base, which can readily be processed using conventional methods, and which at each of its ends is coated with a layer of a transparent plastics material with an aspherical external profile, as indicated hereinbefore. FIG. 3 shows an example of such an embodiment. The reference numeral 31 designates the base, 33 and 34 are the layers of plastic material with aspherical external profiles 35 and 36 respectively.

Such single elements can be suitably integrated in recording equipment for disc-shaped video carriers as described in U.S. Pat. No. 3,876,841, issued Apr. 8, 1975, because of their large apertures and the large fields and also because of their simplicity and low weight, and especially because of their great free image distance, yielding mechanical advantages not attainable with microscope objectives of comparable aperture. Such an application is shown in FIG. 4.

The reference numeral 41 refers to a circular record carrier which is shown in cross-section. Said carrier is rotated with the aid of a motor, not shown. The spindle 44 extends through the record carrier via an opening 42 which is formed in the carrier. The radiation beam 40 which is supplied by the radiation source 45, is reflected by the semitransparent mirror 46 and is incident on the record carrier via the lens 47. The lens 47 is a lens according to the invention. The lens focusses the beam on one of the tracks 43, which are disposed at the lower surface of the record carrier. The beam which is modulated by the information contained in a track is reflected by the reflecting carrier, so that a portion of the track to be read is imaged via the semitransparent mirror 46 onto the photosensitive detector 48, which is connected to electronic means. Owing to its optical properties the lens 47 enables the smallest details in the tracks to be reproduced within the limits imposed by diffraction effects.

What is claimed is:

1. A single lens, wherein an expression for the wave front aberration is represented by a series expansion as a function of the aperture, terms of high degree being utilized, the single lens having spherical refractive surfaces, whose parameters are given by the co-ordinates of a point of the region which is bounded in the plane with the coordinate axes $$\left( \frac{e}{(n-1)f}, \frac{C_2}{C_1} \right)$$

by two straight lines with the respective equations:

$$\frac{C_2}{C_1} = 2.58 - 1.29 \frac{e}{(n-1)f}$$

$$\frac{C_2}{C_1} = 2.2 - 1.5 \frac{e}{(n-1)f}$$

and which is situated between these two straight lines, each of the refractive surfaces being of an aspherical shape for minimizing wave-front aberration, the aspherization of the refractive surfaces being expanded in a series which contains terms of at least the sixth degree as a function of the distance between the points of the refractive surface and the axis of revolution to the lens, where $n$ is the refractive index, $e$ is the thickness, $f$ is the focal length, and $C_1$, $C_2$ are the osculation curvatures of the refractive faces of the lens.

2. A single lens as claimed in claim 1, wherein the medium at the object side and that at the image side have different refractive indexes.

3. A lens as recited in claim 1, comprising two deposited layers of a plastics material, each at one end of a transparent base material, the outer surfaces of each of said layers are aspherical in accordance with the characteristics recited in claim 1.

4. A single lens as claimed in claim 1, wherein the material is a plastic molding material.

5. A single lens as claimed in claim 1, wherein it complies with the specifications of the following Table:

TABLE I

| $n = 1.7$ $C_2/C_1 = 0.284$ | free image distance: 2.6688 mm |
|---|---|
| $C_1 = 0.2068086$ mm$^{-1}$ | free object distance: −160 mm |
| $C_2 = 0.0586528$ mm$^{-1}$ | $\gamma = -0.0565$ |
| $e = 8.184$ mm | |
| $f = 7.5573$ mm | | distance from top of refractive surface at object side to object focus (distance SF in Fig. 1) $= 9.0510$ mm.

Coefficients k and e

| Refractive surface 11 | | Refractive surface 12 | |
|---|---|---|---|
| k | −0.258 | k | −1 |
| $\epsilon_2$ | −0.7179284 10$^{-4}$ | $\epsilon_2$ | 0.8844274 10$^{-2}$ |
| $\epsilon_3$ | −0.2367655 10$^{-5}$ | $\epsilon_3$ | 0.5837108 10$^{-4}$ |
| $\epsilon_4$ | 0.9787664 10$^{-6}$ | $\epsilon_4$ | 0.1042128 10$^{-3}$ |
| $\epsilon_5$ | −0.262211 10$^{-6}$ | $\epsilon_5$ | −0.1625183 10$^{-3}$ |
| $\epsilon_6$ | 0.3795457 10$^{-7}$ | $\epsilon_6$ | −0.1586676 10$^{-3}$ |
| $\epsilon_7$ | −0.3174790 10$^{-8}$ | $\epsilon_7$ | −0.8957358 10$^{-3}$ |
| $\epsilon_8$ | 0.1535543 10$^{-9}$ | $\epsilon_8$ | 0.2977601 10$^{-3}$ |
| $\epsilon_9$ | −0.3983771 10$^{-11}$ | $\epsilon_9$ | −0.5380995 10$^{-4}$ |
| $\epsilon_{10}$ | 0.4301476 10$^{-13}$ | $\epsilon_{10}$ | 0.4125182 10$^{-5}$ |

, where $k$ is a specific coefficient of a conic section with the special values $k = 0$ for a circle and $k = -1$ for a parabola, where $\Xi =$ a magnification factor and the coefficients $\epsilon_i$ are coefficients of aspherization.

6. A single lens as claimed in claim 1, wherein it complies with the specifications of the following Table:

TABLE II

| $n = 1.5$ $C_2/C_1 = 0.202$ | free object distance: −160 mm |
|---|---|
| $C_1 = 0.2912733$ mm$^{-1}$ | free image distance: 3.63171 mm |
| $C_2 = 0.0582546$ mm$^{-1}$ | |
| $e = 5.835$ | |
| $f = 7.51829$ | |
| $\gamma = 0.0495825$ | |

Coefficients k and $\epsilon_i$

| Refractive surface 11 | | Refractive surface 12 | |
|---|---|---|---|
| k | −0.291 | k | −1 |
| $\epsilon_2$ | −0.1926581 10$^{-2}$ | $\epsilon_2$ | 0.1079271 10$^{-1}$ |
| $\epsilon_3$ | −0.1537706 10$^{-4}$ | $\epsilon_3$ | 0.1515678 10$^{-2}$ |
| $\epsilon_4$ | 0.8695365 10$^{-5}$ | $\epsilon_4$ | −0.1388911 10$^{-2}$ |
| $\epsilon_5$ | −0.2938304 10$^{-5}$ | $\epsilon_5$ | −0.2261891 10$^{-3}$ |
| $\epsilon_6$ | 0.6086732 10$^{-6}$ | $\epsilon_6$ | −0.1953849 10$^{-3}$ |
| $\epsilon_7$ | −0.7359854 10$^{-7}$ | $\epsilon_7$ | 0.1053471 10$^{-3}$ |
| $\epsilon_8$ | 0.6318046 10$^{-8}$ | $\epsilon_8$ | −0.3237450 10$^{-3}$ |
| $\epsilon_9$ | −0.2886018 10$^{-9}$ | $\epsilon_9$ | 0.5091558 10$^{-4}$ |
| $\epsilon_{10}$ | 0.5788596 10$^{-11}$ | $\epsilon_{10}$ | −0.2840845 10$^{-5}$ |

, where $k$ is a specific coefficient of a conic section with the special values $k = 0$ for a circle and $k = -1$ for a parabola, where $\Xi =$ a magnification factor and the coefficients $\epsilon_i$ are coefficients of aspherization.

* * * * *

UNITED STATES PATENT AND TRADEMARK OFFICE
CERTIFICATE OF CORRECTION

PATENT NO. : 4,027,952

DATED : June 7, 1977

INVENTOR(S) : EDGARD ALFRED HUGUES

It is certified that error appears in the above-identified patent and that said Letters Patent are hereby corrected as shown below:

Col. 3, line 10, after "7.52" should be --mm--;

line 61, "o-ordinates" should be --co-ordinates--;

Col. 5, line 52, "e = 5.835" should be --e=5.835 mm--;

line 53, "f = 7.51829" should be --f = 7.51829 mm--;

Claim 5, line 41, " $H_1$ " should be -- $\gamma$ --;

Claim 6, line 8, "e = 5.835" should be --e = 5.835 mm--;

line 9, "f = 7.51829" should be --f = 7.51829 mm--;

line 25, " $H_1$ " should be -- $\gamma$ --;

line 1, after "lens" should be --(element)--;

Signed and Sealed this thirtieth Day of August 1977

[SEAL]

Attest:

RUTH C. MASON
*Attesting Officer*

C. MARSHALL DANN
*Commissioner of Patents and Trademarks*